US009485791B2

(12) United States Patent
Strassenburg-Kleciak

(10) Patent No.: US 9,485,791 B2
(45) Date of Patent: Nov. 1, 2016

(54) TECHNIQUES OF ESTABLISHING A WIRELESS DATA CONNECTION

(71) Applicant: Harman Becker Automotive Systems GmbH, Karlsbad (DE)

(72) Inventor: Marek Strassenburg-Kleciak, Garching bei Muenchen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 107 days.

(21) Appl. No.: 14/332,229

(22) Filed: Jul. 15, 2014

(65) Prior Publication Data

US 2015/0016823 A1     Jan. 15, 2015

(30) Foreign Application Priority Data

Jul. 15, 2013   (EP) ..................... 13176504

(51) Int. Cl.
| | | |
|---|---|---|
| B60Q 1/00 | (2006.01) | |
| H04W 76/02 | (2009.01) | |
| H04B 10/114 | (2013.01) | |
| H04W 4/06 | (2009.01) | |
| H04W 4/04 | (2009.01) | |
| H04W 4/20 | (2009.01) | |

(52) U.S. Cl.
CPC ........ *H04W 76/021* (2013.01); *H04B 10/1143* (2013.01); *H04W 4/046* (2013.01); *H04W 4/06* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 8,520,695 B1 * | 8/2013 | Rubin ...................... | G08G 9/02 370/337 |
| 2015/0052352 A1 * | 2/2015 | Dolev ................... | H04W 12/06 713/156 |
| 2015/0206434 A1 * | 7/2015 | Shimotani .............. | G08G 1/161 701/36 |
| 2015/0349885 A1 * | 12/2015 | Endo .................... | H04W 4/008 398/130 |

FOREIGN PATENT DOCUMENTS

EP         1515292 A1      3/2005

OTHER PUBLICATIONS

"Car 2 Car Communication Consortium Manifesto, Overview of the C2C-CC System", Car-2-Car.org, Chapter 5.2, Vehicle 2 Vehicle Unicast Exchange, Aug. 28, 2007, pp. 41-44.
Gerla, Mario, et al. "Vehicular Grid Communications: The Role of the Internet Infrastructure", Proceedings of the 2nd Annual International Workshop on Wireless Internet, Aug. 2, 2006, 10 pages.

(Continued)

*Primary Examiner* — Julie Lieu
(74) *Attorney, Agent, or Firm* — Alleman Hall McCoy Russell & Tuttle LLP

(57) ABSTRACT

A wireless data connection may be established between a first vehicle and a second vehicle, the first vehicle driving ahead of the second vehicle. A forward camera of the second vehicle may obtain image data of a rear portion of the first vehicle and determine an identification number of the first vehicle from the obtained image data. The second vehicle may broadcast a data connection request which indicates at least a part of the determined identification number of the first vehicle.

15 Claims, 5 Drawing Sheets

(56) References Cited

OTHER PUBLICATIONS

Wiedersheim, Björn et al., "SeVeCom—Security and Privacy in Car2Car Ad Hoc Networks", 9th International Conference on Intelligent Transport Systems Telecommunications, Oct. 20, 2009, IEEE, 4 pages.

European Patent Office, Extended European Search Report of EP13176504.2, Germany, Jan. 8, 2014, 9 pages.

* cited by examiner

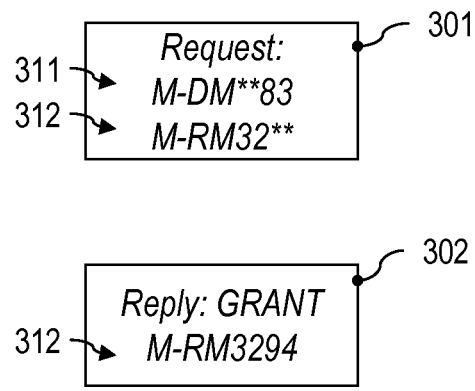
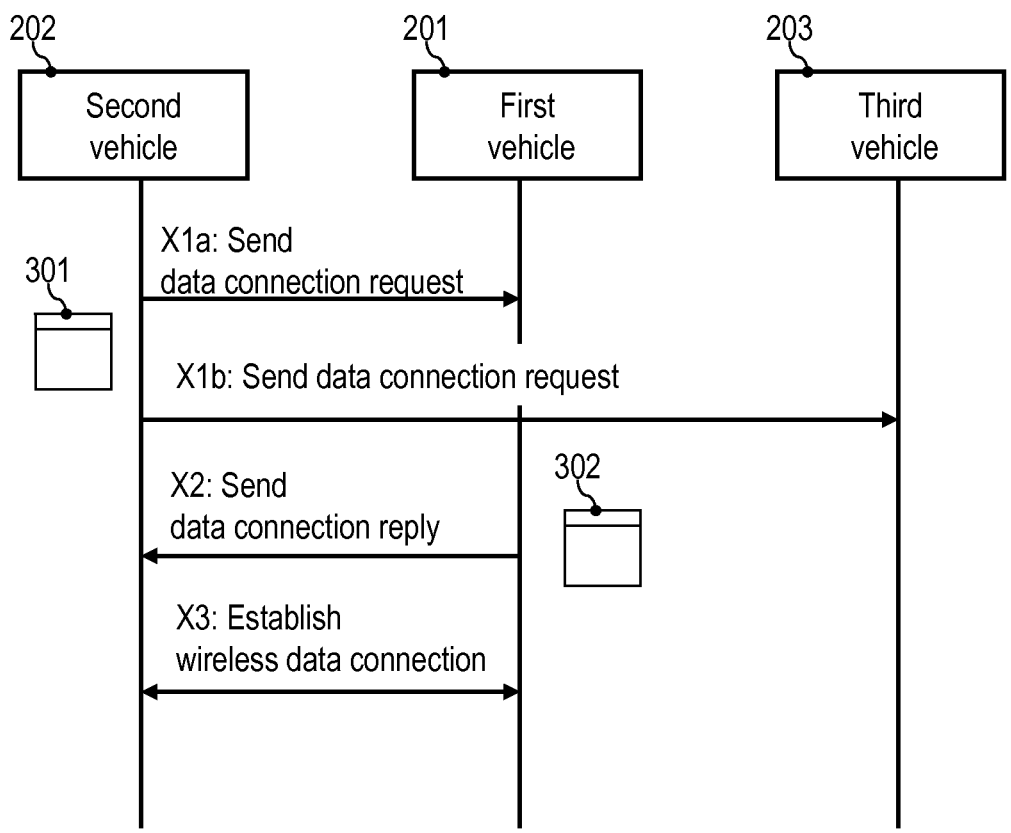
FIG. 4

TECHNIQUES OF ESTABLISHING A WIRELESS DATA CONNECTION

CROSS REFERENCE TO RELATED APPLICATIONS

The present application claims priority to European Patent Application No. 13176504.2 filed on Jul. 15, 2013, which is hereby incorporated by reference in its entirety for all purposes.

FIELD

This disclosure relates to techniques of wireless data connection between a first vehicle and a second vehicle, the first vehicle driving ahead of the second vehicle. In particular, various embodiments relate to techniques where the second vehicle obtains image data which images a rear portion of the first vehicle.

BACKGROUND

Various applications are known where it is desirable to transmit data between a first vehicle and a second vehicle. For example, the first vehicle may be in the vicinity of the second vehicle or may be, in particular, driving ahead of the second vehicle. Such applications may reside in the field of driver assistance, e.g.: warning of dangerous situations on the road, exchange of driving-related data between the first and second vehicles, etc. Such applications are sometimes referred to as car-to-car (c2c) communication.

With respect to such techniques it may be necessary to check from time to time whether the first and second vehicles are within a vicinity with respect to each other and, in particular, whether the first vehicle is driving ahead of the second vehicle. In this regard, techniques are known which establish a wireless data connection between the first and second vehicles. For example, such techniques of pairing the data connection between the first and second vehicles may include exchanging position data between the first and second vehicles, the position data indicating a position of the first vehicle and/or of the second vehicle. E.g., based on this position data, it may be determined whether the first and second vehicles are within the vicinity of each other. In a simple embodiment, determining whether this first and second images are in the vicinity of each other can be based on a signal level of the wireless data connection.

Yet, such techniques as mentioned above may face certain restrictions. For example, it may be comparably complex to establish the wireless data connection when relying on such previously known techniques; e.g., a comparably large amount of data may need to be transmitted between the first and second vehicles. In other reference implementations, the decision criterion for whether the first and second vehicles are within the vicinity of each other may be comparably vague and/or imprecise. E.g., if the decision of pairing is based on the signal level, this may result in a not very well differentiated pairing criterion. Scenarios may occur where the wireless data connection is established, but the first and second vehicles are in fact not within the vicinity with respect to each other.

Therefore, a need exists for advanced techniques of establishing a wireless data connection between a first vehicle and a second vehicle. In particular, a need exists for such techniques which establish the wireless data connection if the first vehicle is driving ahead of the second vehicle, e.g., which consider the first and second vehicles driving in immediate succession. Moreover, a need exists for such techniques which establish the wireless data connection without complex pairing sequences, e.g., requiring a large amount of data to be transmitted between the first and second vehicles, yet, at the same time reliably consider the above-mentioned pairing criterion.

SUMMARY

According to a first aspect of the present disclosure, a method of establishing a wireless data connection between a first vehicle and a second vehicle is provided. The first vehicle drives ahead of the second vehicle. The method comprises a forward camera of the second vehicle obtaining image data which images a rear portion of the first vehicle. The method further comprises determining an identification number of the first vehicle from the obtained image data. The method further comprises the second vehicle broadcasting a data connection request which indicates at least a part of the determined identification number of the first vehicle and which requests the wireless data connection between the first vehicle and the second vehicle. The method further comprises the second vehicle receiving a data connection reply from the first vehicle and, in response to the receiving of the data connection reply, selectively participating in establishing of the wireless data connection between the first vehicle and the second vehicle.

Such techniques may allow for the pairing of the wireless data connection between the first vehicle and the second vehicle. This pairing may be based on the obtained image data which images the rear portion of the first vehicle. E.g., the rear portion of the first vehicle can comprise a license plate of the first vehicle and/or a trunk portion of the first vehicle and/or rear lights of the first vehicle. The forward camera may be mounted in a position of the second vehicle which enables imaging of the rear portion of the first vehicle in the image data. E.g., the forward camera of the second vehicle can be mounted in a front windscreen portion of the second vehicle and have a field of view which covers the forward surrounding of the second vehicle. Typically, the forward camera can be mounted in a central upper part of the front windscreen. Generally, techniques of providing a correspondingly configured forward camera are known to the skilled person such that there is no need to discuss further details in this context.

For example, the identification number of the first vehicle can correspond to numbers and/or letters or, more generally, an alphanumeric code, e.g., of a given length. For example, the identification number can include a check sum which enables a reliable determination of whether the identification number has been correctly determined based on the obtained image data. In order to determine the identification number of the first vehicle from the obtained image data, image analysis techniques may be implemented, e.g. executed by a processor of the second vehicle or of a driver assistance entity thereof. Such image analysis techniques may include: text recognition, pattern recognition, image segmentation, etc.

The second vehicle broadcasting the data connection request can correspond to: the second vehicle sending the data connection request to all vehicles which are within a proximity of the second vehicle, e.g., all vehicles which are close enough to the second vehicle to receive and successfully decode the data connection request. In other words: all vehicles within a transmission range may receive the data connection request. E.g., the broadcasting of the data connection request can occur on a certain specified frequency band of the frequency spectrum and/or can be according to a certain predefined communication standard. Sometimes, such a broadcasting technique is also referred to as point-to-multipoint transmission.

Similar considerations may apply to the data connection reply which is received by the second vehicle. However, it may also possible that the data connection reply is specifically sent to the second vehicle, e.g., by including respective indicators in a header or a corresponding technique. Sometimes, this is referred to as point-to-point transmission.

Likewise, the establishing of the wireless data connection can follow certain predefined rules, such as a predefined frequency spectrum and/or a certain predefined communication standard. In this regard, the wireless data connection between the first vehicle and the second vehicle may employ a transmission technique according to the c2c communication standard and/or the wireless local area network (WLAN) communication standard. It is possible that the method further comprises: exchanging encryption keys between the first and second vehicles; and establishing the wireless data connection in an encrypted manner based on the exchanged encryption keys.

Typically, if the first vehicle indeed drives ahead of the second vehicle, the rear portion of the first vehicle is within a field of view of the forward camera of the second vehicle. Only then it may be possible to obtain the image data which images the rear portion of the first vehicle. Therefore, by successfully determining the identification number of the first vehicle from the image data, it may be assured that the first vehicle indeed drives ahead of the second vehicle. By such means it may be possible to selectively participate in the establishing of the wireless data connection between the first and the second vehicles if the first vehicle drives ahead of the second vehicle.

E.g., considering the first vehicle driving ahead of the second vehicle as a decision criterion for the pairing of the first and second vehicles as mentioned above may have certain favorable effects on applications which employ the established data connection. Such techniques may rely on the first and second vehicles driving in immediate succession. E.g., if the first vehicle issues a warning which is selectively targeted at the second vehicle which drives behind the first vehicle, it may be favorable to selectively establish the wireless data connection according to the techniques mentioned above. A further example would be a scenario where the first vehicle provides certain information which is solely intended for the second vehicle which drives behind the first vehicle.

Further, the above-mentioned techniques may allow for a comparably simple and fast establishing of the wireless data connection between the first and second vehicles—while, at the same time, considering the first and second vehicles driving in immediate succession as a decision criterion for the selective establishment of the wireless data connection. In particular, it may be expendable to transmit position data of the first and/or second vehicles. If compared to conventional techniques, where the position data of the first and/or second vehicles is compared with each other, the present technique allows for a more simple, yet fail-safe and selective establishment of the wireless data connection. Scenarios may be precisely discriminated where the first vehicle is not driving ahead of the second vehicle.

In general, the identification number of the first vehicle can correspond to any identification number which can be determined from the obtained image data and which is machine-readable. For example, at least a part of the identification number of the first vehicle may correspond to a license plate number of the license plate of the first vehicle. This may have the favorable effect that it may be expendable to provide additional markers or tags on the rear portion of the first vehicle—rather, it may be sufficient to provide the license plate number in a conventional manner which allows simple and fail-safe image determining from the obtained image data.

For example, the obtaining of the image data may be based on techniques which are selected from the group comprising: acquiring an optical image of the license plate of the first vehicle in the visible range of the light spectrum; acquiring an infrared image of the license plate of the first vehicle; and acquiring a light pulse emitted by a light source of the first vehicle, the light pulse indicating the identification number of the first vehicle. In other words, and more generally: the image data may include image information which is actively transmitted by the first vehicle. E.g., the light source may be provided in the rear portion of the first vehicle, e.g., as part of the license plate or in an adjacent position. E.g., the light source may correspond to rear lights of the vehicle and/or rear braking lights. The light pulse can be in the visible spectrum of light or can be in the infrared spectrum of light. The light source may emit a series of light pulses which include the information of the identification number of the first vehicle encoded in the temporal sequence, i.e., the time domain. In another scenario, the identification number may further be included in the frequency of the light emitted by the light source, e.g., in the frequency domain. When employing the light source, a reliable establishing of the wireless data connection may be ensured during situations of low ambient light, e.g., in a tunnel or during the night, etc.

E.g., the determining of the identification number of the first vehicle may be based on elements included in the image data which are selected from the group comprising: machine-readable markers arranged on the license plate of the first vehicle; human-readable letters and/or numerals arranged on the license plate of the first vehicle which optionally indicate the license plate number of the first vehicle; and machine-readable light pulses, optionally in a non-visible range of the spectrum of light. For example, the machine-readable markers can correspond to a Quick Response (QR) code. The machine-readable markers can be arranged on a tag which is attached to the license plate, e.g., using an adhesive. The tag could also be printed on the license plate in a more permanent manner. It would also be possible that the machine-readable markers are arranged somewhere else on the rear portion of the first vehicle, e.g., next to the license plate. In a scenario where the machine-readable markers are used for the determining of the identification number, a comparably large amount of information may be determined from the obtained image data—in other words and more generally, the density of information may be higher if the information is provided in a machine-readable manner if compared to a scenario where the information is provided in a human-readable manner. If the identification number of the first vehicle comprises a comparably large amount of digits, this may increase security against fraud in the establishing of the wireless data connection.

The data connection request and/or the data connection reply may further indicate at least a part of an identification number of the second vehicle. E.g., the identification number of the second vehicle may correspond to a license plate number of a license plate of the second vehicle. In general, similar considerations may apply to the identification number of the second vehicle as mentioned above with respect to the license plate number of the first vehicle, with the proviso that the identification number of the second vehicle may be determined from further image data which images a front portion of the second vehicle.

By also including the identification number of the second vehicle in the data connection request and/or the data connection reply, security against fraud in the establishing of the wireless data connection may be increased. E.g., it may be possible to cross-check the identification number of the second vehicle, e.g., with the further obtained image data and/or with user input.

The method may further comprise determining a first part and a second part of the identification number of the first vehicle from the obtained image data. The data connection request may indicate the first part of the identification number of the first vehicle. The data connection reply may indicate at least the second part of the identification number of the first vehicle. The method may further comprise comparing the second part of the identification number of the first vehicle as indicated in the data connection reply with the second part of the identification number of the first vehicle as determined from the image data. The selectively participating in the establishing of the wireless data connection may be dependent on the comparing.

By such techniques, it may be possible to decrease the likelihood of an unauthorized third party gaining access to the wireless data connection. In particular, by only transmitting the first part of the identification number of the first vehicle and crosschecking the second part, a third party not knowing this second part may be excluded from the pairing of the wireless data connection. Generally, the security of the wireless data connection pairing may be increased.

When the wireless data connection has been established, the method may further comprise repeatedly obtaining the image data; and repeatedly determining the identification number of the first vehicle from the obtained image data; and, based on the repeatedly acquiring and determining, monitoring whether the first vehicle is ahead of the second vehicle. By such means it may be ensured that while the wireless data connection is established, the first vehicle keeps driving ahead of the second vehicle. If the distance between the first and second vehicle increases or if a further vehicle moves in-between the first and second vehicles, at some point it may not be possible to determine the identification number of the first vehicle from the obtained image data. In such a case, the monitoring may yield that the first vehicle is not ahead of the second vehicle anymore. In such a case it may be possible to disconnect the wireless data connection or issue a warning, etc.

According to a further aspect, a vehicle communication device of a second vehicle for establishing a wireless data connection with a first vehicle when the first vehicle drives ahead of the second vehicle is provided. The vehicle communication device comprises a forward camera which is configured to obtain image data which images a rear portion of the first vehicle. The vehicle communication device further comprises a processor which is configured to determine an identification number of the first vehicle from the obtained image data. The vehicle communication device further comprises a transceiver which is configured to broadcast a data connection request. The data connection request indicates at least a part of the determined identification number of the first vehicle and requests the wireless data connection between the first vehicle and the second vehicle. The transceiver is further configured to receive a data connection reply from the first vehicle. The transceiver is further configured to selectively participate in establishment of the wireless data connection between the first and second vehicles, in response to the receiving of the data connection reply.

E.g., the vehicle communication device of the presently discussed aspect can be further configured to execute the method of establishing a wireless data connection according to a further aspect.

For the vehicle communication device according to the presently discussed aspect, effects may be obtained which are comparable to the effects which can be obtained with the method of establishing a wireless data connection according to a further aspect.

According to a further aspect, a method of establishing a wireless data connection between a first vehicle and a second vehicle is provided. The first vehicle drives ahead of the second vehicle. The method comprises receiving a data connection request from the second vehicle. The data connection request indicates at least a part of an identification number of the first vehicle and request the wireless data connection between the first vehicle and the second vehicle. The method further comprises, in response to the receiving of the data connection request: selectively transmitting a data connection reply. The method further comprises selectively participating in establishing of the wireless data connection between the first vehicle and the second vehicle.

E.g., the selective transmission of the data connection reply may depend on a user input. Yet, alternatively or additionally, further criteria are possible. E.g., the method may further comprise comparing the at least a part of the identification number of the first vehicle as indicated by the received data connection request with a locally stored identification number of the first vehicle. The selective transmission of the data connection reply may further depend on the comparison.

E.g., if it is determined that the at least a part of the identification number of the first vehicle as indicated by the received data connection request matches the locally stored identification number of the first vehicle, the data connection reply may be transmitted. Namely, in such a scenario it may be assumed the data connection request was indeed addressed to the first vehicle—and not to a further vehicle. E.g., the data connection reply may further comprise the missing parts of the identification number of the first vehicle. This may enable the originator of the data connection request, e.g., the second vehicle, to cross-check the missing parts of the identification number; in such a manner, it may be ensured that the data connection reply indeed originates from an authorized participant of the establishing of the wireless data connection, e.g., the first vehicle, and is not provided by an unauthorized third party.

The received data connection request may indicate at least a part of an identification number of the second vehicle. The method may further comprise a rearward camera of the first vehicle obtaining further image data imaging a front portion of the second vehicle; and determining the identification number of the second vehicle from the obtained further image data; and comparing the identification number of the second vehicle that has been determined from the further image data with at least a part of the identification number of the second vehicle as indicated by the received data connection request.

E.g., the rearward camera of the first vehicle may be mounted in the rear portion of the first vehicle. It is possible that the rearward camera is mounted in the license plate of the first vehicle or in the rear windshield of the first vehicle, e.g., in a central portion thereof.

In general, similar scenarios may apply to the identification number of the second vehicle as has been previously discussed with respect to the identification number of the first vehicle. E.g., the identification number of the second vehicle may correspond to a license plate number of a license plate of the second vehicle and/or may correspond to machine-readable markers which are arranged on the front portion of the second vehicle. Typically, the rearward camera of the first vehicle will only be able to obtain further image data which images the front portion of the second vehicle if the second vehicle indeed drives behind the first vehicle when the first and second vehicle move in immediate succession.

Further, by transmitting only a part of the identification number of the second vehicle as part of the data connection request and by determining the missing part of the identification number of the second vehicle from the obtained further image data, security against fraud may be increased. In particular, an unauthorized third party which is not located appropriately so as to obtain corresponding further image data may not be able to participate in the techniques as explained above. Thereby, security of the pairing of the first and second vehicles via the wireless data connection may be increased.

The method may further comprise, in response to the establishment of the wireless data connection: automatically providing a human-perceivable optical confirmation by using light sources arranged on the rear part of the first vehicle. E.g., once the wireless data connection pairing has been successfully completed, the first vehicle may automatically activate, e.g., for a limited period of time, at least one of the rear lights. E.g., the blinkers of the first vehicle may be operated. In such a manner, the driver of the second vehicle may understand that the wireless data connection has been successfully established.

According to a further aspect, a vehicle communication device of a first vehicle which is configured to establish a wireless data connection between the first vehicle and a second vehicle when the first vehicle drives ahead of the second vehicle is provided. The vehicle communication device comprises a transceiver configured to receive a data connection request from the second vehicle. The data connection request indicates at least a part of an identification number of the first vehicle and requests the wireless data connection between the first vehicle and the second vehicle. The transceiver is further configured to, in response to the receiving of the data connection request, selectively transmit a data connection reply. The transceiver is further configured to selectively participate in the establishment of the wireless data connection between the first vehicle and the second vehicle.

E.g., the vehicle communication device of the first vehicle according to the presently discussed aspect may be configured to execute the method of establishing a wireless data connection according to a further aspect.

For the vehicle communication device of the first vehicle according to the presently discussed aspect, effects may be obtained which are comparable to the effects which may be obtained with the method of establishing a wireless data connection.

The features and aspects mentioned above and features and aspects yet to be explained can be used not only in the illustrated embodiments, but also in combinations of embodiments which are not explicitly described above. Features and aspects can be combined unless explicitly noted otherwise. Aspects, embodiments, and effects of the present invention will become more apparent from the detailed description when read in conjunction with the accompanying drawings. In the drawings:

BRIEF DESCRIPTION OF THE DRAWINGS

FIG. 3 illustrates a data communication request and a data communication reply which are employed in the course of establishing of a wireless data connection between the first and second vehicles.

FIG. 4 is a signaling diagram of the establishment of the wireless data connection according to various embodiments of the present invention.

DETAILED DESCRIPTION

Figure 1:
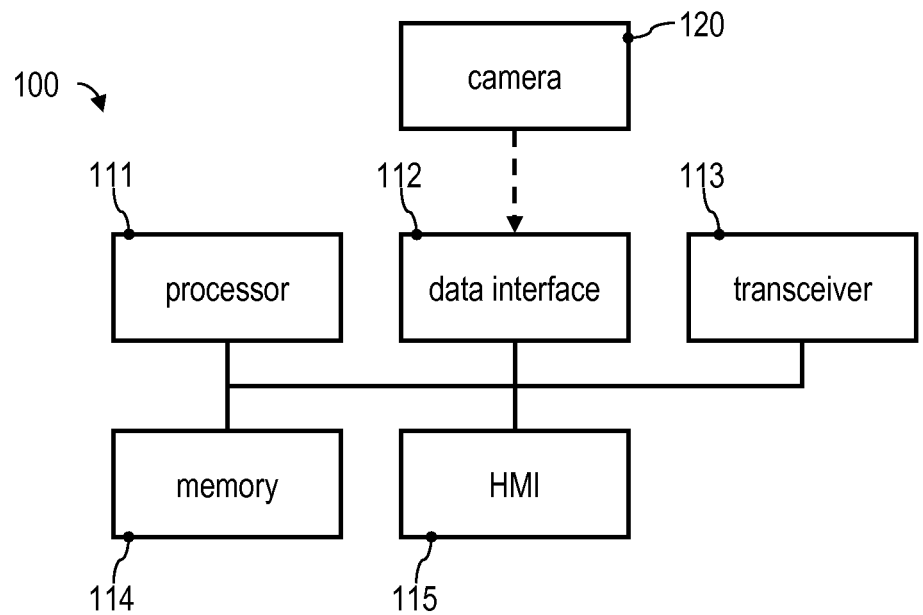
FIG. 1 is a schematic illustration of a vehicle communication device.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be taken illustratively only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. The coupling between components may also be established over a wireless connection, unless explicitly noted otherwise. Functional blocks may be implemented in hardware, firmware, software, or a combination thereof.

In the following, techniques are discussed which relate to the establishment of a wireless connection between a first vehicle and a second vehicle, e.g., to the wireless data connection pairing. In particular, the techniques enable selective establishment of the wireless data connection if the first vehicle drives ahead of the second vehicle, e.g., if the first and second vehicles drive in immediate succession with respect to each other.

In FIG. 1, a vehicle communication device 100 according to various embodiments is shown. Inter-related counterparts of the vehicle communication device 100 may be present in the first vehicle and/or the second vehicle. The vehicle communication device 100 comprises a processor 111, e.g., a multi-core processor. The processor 111 can access a memory 114. Memory 114 may include a non-transitory computer-readable medium including instructions executable by processor 111, e.g. instructions executable by processor 111 for performing the methods described herein. Various tasks can be assigned to the processor 111, including, but not limited to: encoding and decoding of messages sent and/or received via the wireless data connection; image analysis of data obtained via the wireless data connection and/or from an optical camera 120; outputting information and/or receiving information from a user of the vehicle communication device 100 via a human-machine interface (HMI) 115, etc.

As can be further seen from FIG. 1, the camera 120 provides the image data via a data interface 112 to the vehicle communication device 100. In other words, the camera 120 may or may not be part of the vehicle communication device 100. E.g., it is possible that the camera 120 is an external entity and is only coupled with the vehicle communication device, e.g., via a vehicle bus system or any other suited connection.

Further, a transceiver 113 is provided for sending and/or receiving of messages via the wireless data connection. In such a manner, the vehicle communication device 100 can communicate with inter-related counterparts of other vehicles. As mentioned above with respect to the camera 120, it is also possible that the transceiver 113 is an external entity and communication between the vehicle communication device 100 and the transceiver 113 is established via a respectively configured interface.

Figure 2:
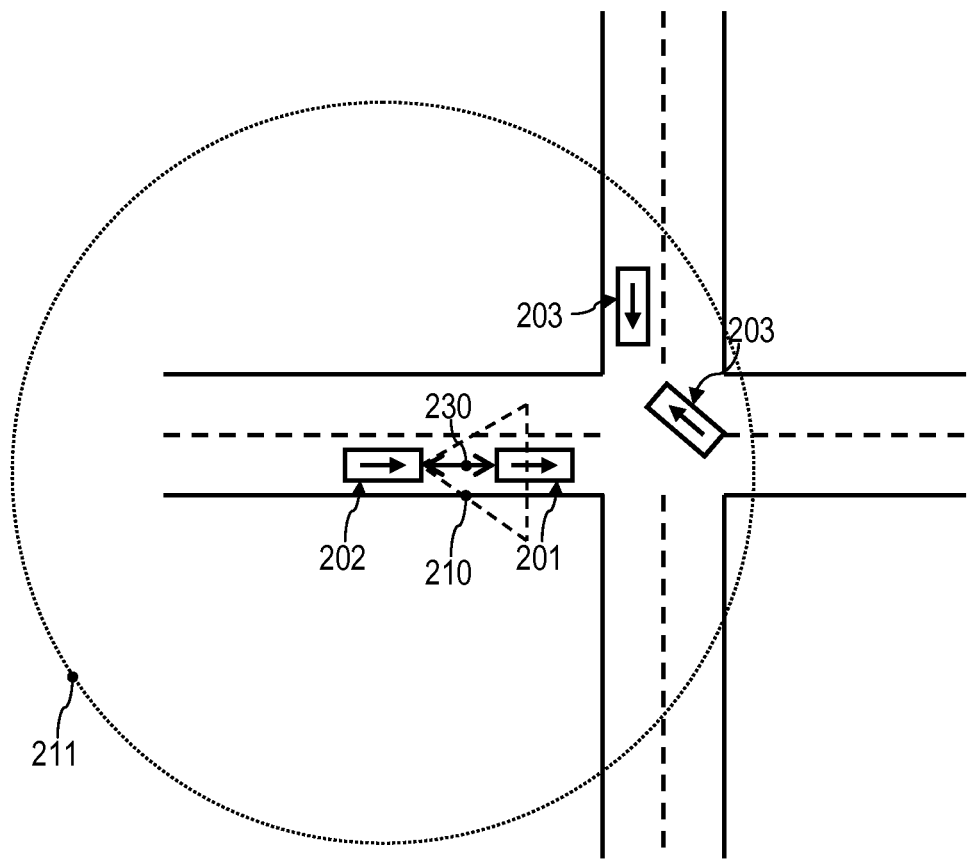
FIG. 2 schematically illustrates a second vehicle which drives behind a first vehicle.

Considering a case where the vehicle communication device 100 as discussed with respect to FIG. 1 is part of a second vehicle: here, e.g., the transceiver 113 can send data and/or receive data to and/or from a first vehicle. Such a scenario is shown in FIG. 2. In FIG. 2, the first vehicle 201 drives ahead of the second vehicle 202. Further vehicles 203, which are within a vicinity of the first and second vehicles, are also shown. In FIG. 2, the wireless data connection 230 established between the first and second vehicles 201, 202 is illustrated by the horizontal arrow labeled 230.

Further illustrated in FIG. 2 is a transmission range 211 of the transceiver 113 of the vehicle communication device 100 of the second vehicle 202. For example, if the transceiver 113 of the second vehicle 202 broadcasts a message, the first vehicle 201 and the further vehicles 203—which are all located within the transmission range 211—can receive and successfully decode the broadcasted message.

In the following, techniques will be described in detail which allow selective establishment of the wireless data connection 230 between the first and second vehicles 201, 202 which drive in immediate succession with respect to each other. In other words, techniques are described which enable discrimination between the first and second vehicles 201, 202 driving in immediate succession, and the further vehicles 203. For this, the camera 120 monitors a field of view 210 arranged in the driving direction of the second vehicle 202. In this light, the camera 120 can also be referred to as a forward camera of the second vehicle 202. Image data obtained by the camera 120 therefore images a rear portion of a first vehicle 201 if the first vehicle 201 drives ahead of the second vehicle 202 (as depicted in FIG. 2). Then, based on the obtained image data, the processor 111 determines an identification number of the first vehicle 201 from the image data; the identification number is provided in the rear portion of the first vehicle 201.

The transceiver 113 transmits a data connection request 301 (cf. FIG. 3) which indicates at least a part of the determined identification number 311 of the first vehicle 201. The data connection request 301 implicitly and/or explicitly requests the wireless data connection 230 between the first and second vehicles 201, 202. In the scenario illustrated in FIG. 3, the data connection request 301 further indicates at least a part of an identification number 312 of the second vehicle 202. Missing parts of the identification number 311, 312 of the first and second vehicles 201, 202 are graphically illustrated by stars in FIG. 3 for the purpose of better understanding. Which parts of the identifications numbers 311, 312 are transmitted and which parts are not transmitted may be defined by predefined or negotiated rules, e.g., as specified in a header of the data connection request 301 (not shown in FIG. 3).

Since the first vehicle 201 is situated within the transmission range 211 of the transceiver 113 of the vehicle communication device 100 of the second vehicle 202, it can receive the data connection request 301. In response to this receiving, the first vehicle 201 can grant or deny the establishment of the wireless data connection 230 between the first and second vehicles 201, 202. The further vehicles 203 do not respond to the data connection request 301 since, at least from the at least a part of the identification number 311 of the first vehicle 201, it can be deduced that the further vehicles 203 are not the proper addressees of the data connection request 301.

Next, if the first vehicle 201 grants the establishment of the wireless data connection, it sends a data connection reply 302 which includes, in the scenario of FIG. 3, the entire identification number 312 of the second vehicle 202. Alternatively or additionally, it is possible that the data connection reply 302 only includes the missing parts of the identification number 312 of the second vehicle 202. Alternatively or additionally it would be possible that the data connection reply 302 includes all of the parts of the identification number 311 of the first vehicle 201, or only the missing parts of the identification number 311 of the first vehicle.

It is typically expendable that the first vehicle 201 verifies that it is driving immediately ahead of the second vehicle 202, since it can be assumed that the data connection request 301 would not have been sent by the second vehicle 202 if this was not the case. However, in general, e.g., by means of a rearward camera, it is possible that the first vehicle 201 verifies that the second vehicle 202 is immediately behind the first vehicle 201.

The vehicle communication device 100 of the second vehicle 202 then receives the data connection reply 302 via the transceiver 113. In response to the receiving of the data connection reply 302, the first and second vehicles 201, 202 participate in the establishment of the wireless data connection 230. As part of this process of the pairing of the first and second vehicles 201, 202, further control messages can be exchanged between the first and second vehicles 201, 202. These control messages can determine certain connection rules, set various connection parameters, e.g., Quality of Service (QoS) parameters, sending and receiving window sizes, time-out times, and/or maximum packet sizes, etc. Once the wireless data connection 230 has been established, point-to-point packets carrying certain payload data can be exchanged between the first and second vehicles 201, 202. Various applications, e.g., including driver assistance applications, can make use of the wireless data connection 230 thus established.

In order to increase security in the establishing of the wireless data connection 230, for example, the vehicle communication device 100 of the second vehicle 202 may only participate in the establishing of the wireless data connection 230 if the identification number 312 of the second vehicle 202 as indicated in the data connection reply 302 matches the identification number 312 of the second vehicle 202 as stored in the memory 114. Namely, it is possible that a rearward camera of a first vehicle 201 obtains further image data which images a front portion of the second vehicle 202 and that the first vehicle 201 determines the identification number 312 of the second vehicle 202 from the obtained further image data. For third parties which do not have access to the further image data, it may therefore not be possible or only possible to a limited degree to provide the missing parts of the identification number 312 of the second vehicle 202. Therefore, if the comparing of the identification number 312 of the second vehicle 202 as determined from the further image data with the at least a part of the identification number 312 of the second vehicle 202 as indicated by the data connection reply 312 yields a match, it may be assumed that the originator of the data connection reply 302 is indeed the first vehicle 201.

In FIG. 4, a signaling diagram for techniques of establishing the wireless data connection 230 between the first and second vehicles 201, 202 according to various embodiments is illustrated. First, in steps X1a, X1b the second vehicle 202 broadcasts the data connection request 301 to all vehicles in its vicinity, e.g., the first vehicle 201 and the further vehicles 203. Note that steps X1a, X1b can relate to a single physical process of sending the data connection request 301—only for purposes of better understanding, the steps X1a, X1b are illustrated as separate steps in FIG. 4. The first vehicle 201 and the further vehicles 203 compare the identification number 311 of the first vehicle 201 as indicated by the data connection request 301 to a locally stored version of the corresponding identification number. A match is only yielded for the first vehicle 201 which therefore replies in step X2 by sending the data connection reply 302.

The data connection reply 302 includes a grant of the requested wireless data connection 230 such that in step X3 the wireless data connection 230 is established. Both the first and second vehicles 201, 202 participate in step X3. Then the pairing of the first and second vehicles 201, 202 has been completed and the wireless data connection is established.

Figure 5:
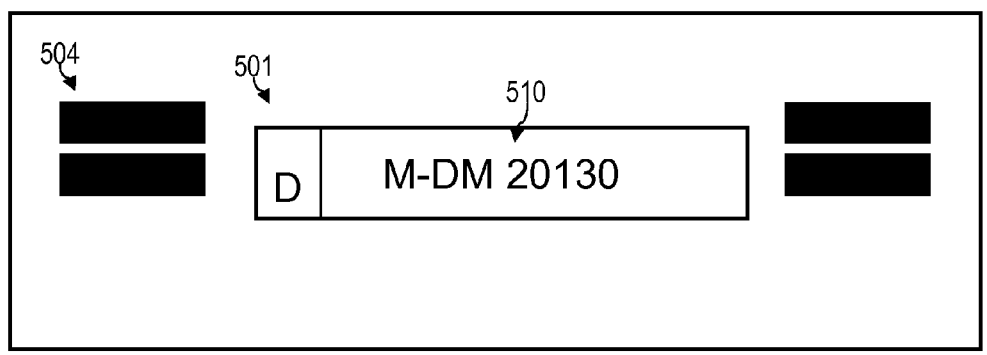
FIG. 5 illustrates a rear portion of a first vehicle including an identification number in the form of a license plate number.

In FIG. 5, a rear portion 500 of the first vehicle 201 is illustrated. The rear portion 500 of the first vehicle 201 is imaged by the image data obtained by the forward camera 120 of the second vehicle 202 if the first vehicle 201 drives ahead of the second vehicle 202. As can be seen from FIG. 5, the rear portion 500 of the first vehicle 201 comprises a license plate 501 and rear lights 504. Arranged on the license plate 501 is a license plate number 510. For example, it is possible that the license plate number 510 is the identification number 311 of the first vehicle 201.

Figure 6:
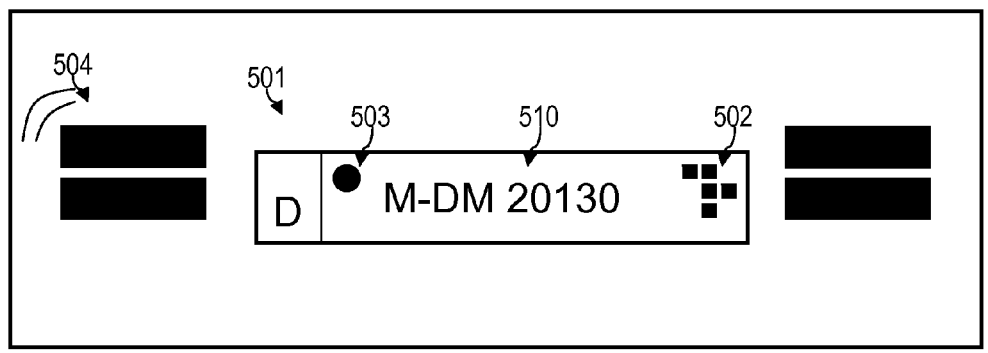
FIG. 6 illustrates the rear portion of the first vehicle further including a light source and machine-readable markers arranged on the license plate of the first vehicle.

In FIG. 6, the rear portion 500 of the first vehicle 201 further comprises a light source 503 and machine-readable markers 502. For example, the machine-readable markers 502 can correspond to a QR code. It is possible that the identification number of the first vehicle 201 is encoded in the machine-readable markers 502 and/or is encoded in machine-readable light pulses which are emitted by the light source 503. In such a scenario, it is not necessary that the identification number 311 of the first vehicle 201 corresponds to the license plate number 510 of the first vehicle 201; however, such a scenario is also possible. In latter case, the identification number 311 may be redundantly determined from a plurality of graphical features in the obtained image data.

As can be seen from FIGS. 5 and 6, various techniques exist which enable imaging of the identification number 311 in the image data which is obtained by the forward camera 120 of the second vehicle 202. Typically, the rear portion 500 of the first vehicle 201 is only visible to the forward camera 120 of the second vehicle 202 which drives directly behind the first vehicle 201, and is not visible by the further vehicles 203 which are located in the vicinity of the first and second vehicles 201, 202. Therefore, by such techniques it may be ensured that the wireless data connection 230 is established by the first and second vehicles 201, 202 driving in immediate succession, and not between the second vehicle 202 and one of the further vehicles 203.

E.g., once the wireless data connection 230 has been established between the first and second vehicles 201, 202, the vehicle communication device 100 can be configured to continuously monitor whether the image data obtained from the forward camera 120 still images the identification number 211 of the first vehicle 201. E.g., once the image data obtained from the forward camera 120 does not image the identification number 311 of the first vehicle 201 anymore, it may be assumed that the second vehicle 202 does not drive behind the first vehicle 201 anymore. Then it is possible to disconnect the wireless data connection 230—e.g., even if the first vehicle 201 still resides within the transmission range 211.

Figure 7:
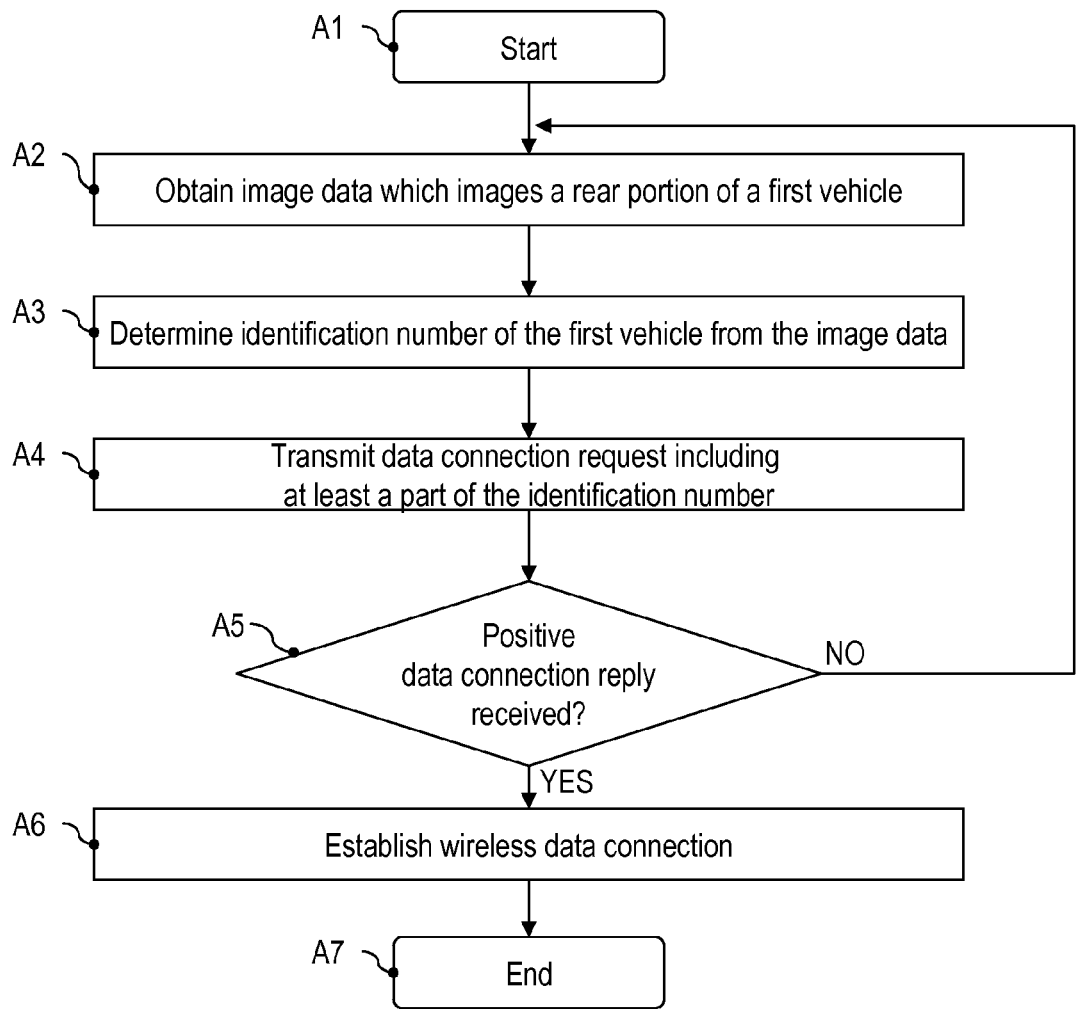
FIG. 7 is a flowchart which illustrates a method of establishing a wireless data connection between a first vehicle and a second vehicle according to various aspects and embodiments of the present invention.

In FIG. 7, a flowchart of a method of establishing the wireless data connection 230 between the first and second vehicles 201, 202 is illustrated. The method starts in step A1. In step A2, the image data is obtained from the forward camera 120 of the second vehicle 202. The image data images the rear portion 500 of the first vehicle 201, because the first vehicle 201 drives behind the second vehicle 202. E.g., it would be possible that the second vehicle 202 continuously checks the image data for the identification number.

Next, in step A3, the identification number 311 of the first vehicle 201 is determined from the obtained image data of step A2. For example, step A3 may include a text recognition, e.g., if the identification number 311 corresponds, at least in part, to the license plate number 510 of the license plate 501 of the first vehicle 201. Likewise, step A3 can include decoding of light pulses emitted by the light source 503 and/or decoding of the machine-readable code of the markers 502, e.g., by means of patter detection or various other techniques. Combinations of the techniques as described above are possible. The identification number 311 can correspond to a combination of thus determined numbers.

In step A4, the data connection request 301 is broadcasted via the transceiver 113. The data connection request 301 includes at least a part of the previously determined identification number 311 of the first vehicle 201.

In step A5, it is checked whether a positive data connection reply 302 is received via the transceiver 113. A positive data connection reply can comprise the missing parts of the identification number 311 of the first vehicle 201 and/or missing parts or the entire identification number 312 of the second vehicle and/or a grant of the requested wireless data connection 230, for example. The grant can be implicitly included in the data connection reply 302.

If the positive data connection reply is not received in step A5, the method recommences with step A2, e.g., after a certain time has elapsed. Otherwise, in step A6 the wireless data connection 230 is established. Step A6 can include the transceiver 113 sending and receiving further control messages. The method ends in step A7.

Figure 8:
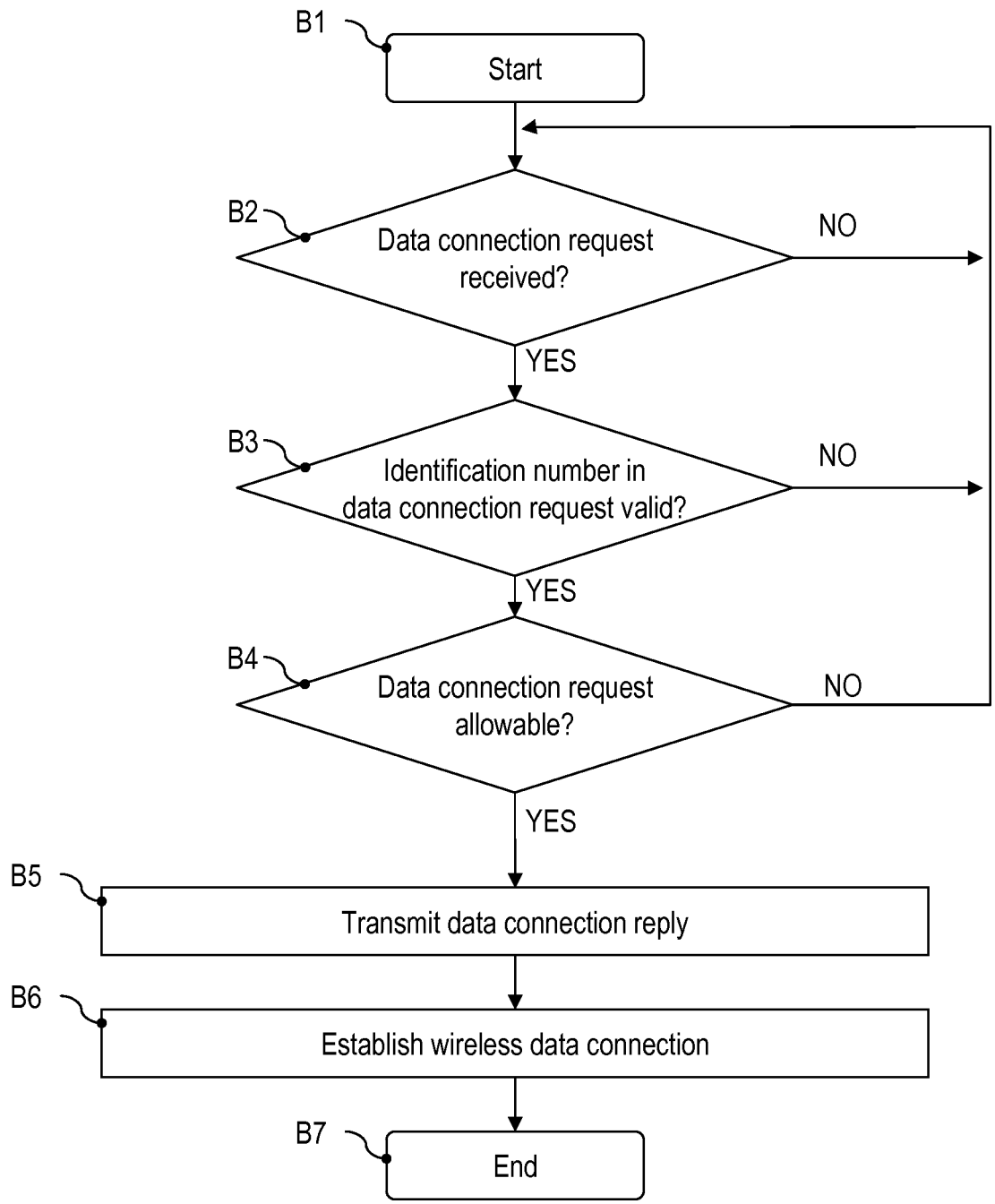
FIG. 8 is a flowchart which illustrates a method of establishing a wireless data connection between a first vehicle and a second vehicle according to various aspects and embodiments of the present invention.

In FIG. 8, a flowchart of a method of establishing the wireless data connection 230 between the first and second vehicles 201, 202 according to various embodiments is illustrated. For example, the method according to the flowchart in FIG. 8 can be executed by the first vehicle 201.

The method starts in step B1. In step B2 it is checked whether the data connection request 301 is received. Only if the data connection request 301 has been received, the method commences with step B3. In step B3 it is checked whether the at least a part of the identification number 311 of the first vehicle 201 indicated by the received data connection request 301 is valid. For this, the received at least a part of the identification number 311 of the first vehicle 201 can be compared with a locally stored version thereof. In case the received and stored parts of the identification number 311 of the first vehicle 201 match, the method commences with step B4. In step B4 it is checked whether the data connection request 301 is allowable, i.e., can be granted. For example, in step B4 a user input can be received which either grants or denies the data connection requests. If the identification number in step B3 is not valid and/or the data connection request 301 in step B4 is not allowable, the method commences with step B2.

In case of a grant, in step B5 the data connection reply 302 is sent. Then, in step B6, the wireless data connection 230 is established between the first and second vehicles 201, 202. For example, once the wireless data connection 230 has been established, the first vehicle 201 can be configured for providing a human-perceivable optical confirmation of this establishing of the wireless data connection 230. This can be achieved, e.g., by operating the rear lights 405 of the first vehicle 201 in a distinct manner, e.g., by shortly flashing. The method ends in step B7.

Even though various aspects of the present invention have been described with respect to certain embodiments and aspects, various modifications will occur to the person skilled in the art. The scope of the present application is only limited by the appended claims.

The invention claimed is:

1. A method of establishing a wireless data connection between a first vehicle and a second vehicle, the first vehicle driving ahead of the second vehicle, the method comprising:
    a forward camera of the second vehicle obtaining image data imaging a rear portion of the first vehicle,
    determining an identification number of the first vehicle from the obtained image data,
    the second vehicle broadcasting a data connection request, the data connection request indicating at least a part of the determined identification number of the first vehicle and requesting the wireless data connection between the first vehicle and the second vehicle,
    the second vehicle receiving a data connection reply from the first vehicle, and
    in response to the receiving of the data connection reply, selectively participating in establishment of the wireless data connection between the first vehicle and the second vehicle.

2. The method of claim 1, wherein at least a part of the identification number of the first vehicle corresponds to a license plate number of a license plate of the first vehicle.

3. The method of claim 1, wherein the obtaining of the image data is based on techniques selected from the group comprising:
    acquiring an optical image of a license plate of the first vehicle in the visible range of the light spectrum;
    acquiring an infrared image of the license plate of the first vehicle; and
    acquiring a light pulse emitted by a light source of the first vehicle, the light pulse indicating the identification number of the first vehicle.

4. The method of claim 1, wherein the determining of the identification number of the first vehicle is based on elements included in the image data which are selected from the group comprising:
    machine-readable markers arranged on a license plate of the first vehicle;
    human-readable letters and/or numerals arranged on the license plate of the first vehicle which indicate a license plate number of the first vehicle;
    machine-readable light-pulses in a non-visible range of the spectrum of light.

5. The method of claim 1, wherein the data connection request and/or the data connection reply further indicate at least a part of an identification number of the second vehicle.

6. The method of claim 1, further comprising:
    determining a first part and a second part of the identification number of the first vehicle from the obtained image data, the data connection request indicating the first part of the identification number of the first vehicle and the data connection reply indicating at least the second part of the identification number of the first vehicle, and
    comparing the second part of the identification number of the first vehicle as indicated in the data connection reply with the second part of the identification number of the first vehicle as determined from the image data,
    wherein the participating in the establishment of the wireless data connection is dependent on the comparison.

7. The method of claim 1, wherein the wireless data connection between the first vehicle and the second vehicle employs a transmission technique according to the Car-To-Car communication standard.

8. The method of claim 1, further comprising, when the wireless data connection has been established:
    repeatedly obtaining the image data,
    repeatedly determining the identification number of the first vehicle from the obtained image data, and
    based on the repeated obtaining and determining, monitoring whether the first vehicle is ahead of the second vehicle.

9. A vehicle communication device of a second vehicle for establishing a wireless data connection with a first vehicle, the first vehicle driving ahead of the second vehicle, the vehicle communication device comprising:
    a forward camera configured to obtain image data imaging a rear portion of the first vehicle,
    a processor configured to determine an identification number of the first vehicle from the obtained image data,
    a transceiver configured to broadcast a data connection request, the data connection request indicating at least a part of the determined identification number of the first vehicle and requesting the wireless data connection between the first vehicle and the second vehicle, and further configured to receive a data connection reply from the first vehicle,
    wherein the transceiver is further configured to selectively participate in establishment of the wireless data connection between the first vehicle and the second vehicle in response to the receiving of the data connection reply.

10. The vehicle communication device of claim 9, further comprising instructions stored in a non-transitory computer-readable medium, the instructions executable by the processor to:
   obtain image data with a forward camera of the second vehicle, the image data imaging the rear portion of the first vehicle,
   determine an identification number of the first vehicle from the obtained image data,
   broadcasting a data connection request from the second vehicle, the data connection request indicating at least a part of the determined identification number of the first vehicle and requesting the wireless data connection between the first vehicle and the second vehicle,
   receive a data connection reply at the second vehicle from the first vehicle, and
   in response to the receiving of the data connection reply, selectively participate in establishment of the wireless data connection between the first vehicle and the second vehicle.

11. A method of establishing a wireless data connection between a first vehicle and a second vehicle, the first vehicle driving ahead of the second vehicle, the method comprising:
   receiving a data connection request from the second vehicle, the data connection request indicating at least a part of an identification number of the first vehicle and requesting the wireless data connection between the first vehicle and the second vehicle,
   in response to the receiving of the data connection request, selectively transmitting a data connection reply, and
   selectively participating in establishment of the wireless data connection between the first vehicle and the second vehicle.

12. The method of claim 11, further comprising:
   comparing the at least a part of the identification number of the first vehicle as indicated by the received data connection request with a locally stored identification number of the first vehicle,
   wherein the selective transmission of the data connection reply further depends on the comparison.

13. The method of claim 11, wherein the received data connection request indicates at least a part of an identification number of the second vehicle, the method further comprising:
   a rearward camera of the first vehicle obtaining further image data imaging a front portion of the second vehicle,
   determining the identification number of the second vehicle from the obtained further image data, and
   comparing the identification number of the second vehicle as determined from the further image data with the at least a part of the identification number of the second vehicle as indicated by the received data connection request.

14. The method of claim 11, further comprising:
   in response to the establishment of the wireless data connection, automatically providing a human-perceivable optical confirmation via light sources arranged on a rear portion of the first vehicle.

15. A vehicle communication device of a first vehicle configured to establish a wireless data connection between the first vehicle and a second vehicle, the first vehicle driving ahead of the second vehicle, the vehicle communication device comprising:
   a transceiver configured to receive a data connection request from the second vehicle, the data connection request indicating at least a part of an identification number of the first vehicle and requesting the wireless data connection between the first vehicle and the second vehicle, and further configured to, in response to the receiving of the data connection request, selectively transmit a data connection reply, and further configured to selectively participate in establishment of the wireless data connection between the first vehicle and the second vehicle.

\* \* \* \* \*